(12) United States Patent
Mochizuki

(10) Patent No.: US 8,496,096 B2
(45) Date of Patent: Jul. 30, 2013

(54) FRONT FORK

(75) Inventor: Takahisa Mochizuki, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 390 days.

(21) Appl. No.: 12/735,444

(22) PCT Filed: Sep. 25, 2009

(86) PCT No.: PCT/JP2009/067202
§ 371 (c)(1),
(2), (4) Date: Jul. 16, 2010

(87) PCT Pub. No.: WO2010/038843
PCT Pub. Date: Apr. 8, 2010

(65) Prior Publication Data
US 2010/0294605 A1  Nov. 25, 2010

(30) Foreign Application Priority Data

Oct. 2, 2008 (JP) ................................ 2008-257454
Oct. 2, 2008 (JP) ................................ 2008-257455

(51) Int. Cl.
*F16F 9/00* (2006.01)

(52) U.S. Cl.
USPC ............... 188/313; 188/319.1; 188/322.19; 188/322.21; 188/299.1

(58) Field of Classification Search
USPC ............ 188/319.1, 322.19, 322, 21, 299.1
See application file for complete search history.

(56) References Cited

U.S. PATENT DOCUMENTS

| 4,830,395 | A | * | 5/1989 | Foley | 280/124.162 |
| 5,009,451 | A | * | 4/1991 | Hayashi et al. | 280/6.157 |
| 5,022,501 | A | * | 6/1991 | Hayashi et al. | 188/300 |
| 5,101,923 | A |   | 4/1992 | Odagi et al. | |
| 5,181,696 | A | * | 1/1993 | Abe | 267/64.17 |

FOREIGN PATENT DOCUMENTS

| JP | 58-188283 A | 12/1983 |
| JP | 03-140645 A | 6/1991 |
| JP | 04-008934 A | 1/1992 |
| JP | 08-296692 A | 11/1996 |
| JP | 09-133173 A | 5/1997 |
| JP | 2002-061698 A | 2/2002 |
| JP | 2008-014431 A | 1/2008 |

* cited by examiner

*Primary Examiner* — Bradley King
*Assistant Examiner* — Mahbubur Rashid
(74) *Attorney, Agent, or Firm* — Rabin & Berdo, P.C.

(57) ABSTRACT

In a front fork which is capable of adjusting a spring force of a suspension spring housed in a fork main body by driving a jack mechanism housed in the fork main body to raise and lower an upper end position of the suspension spring, the jack mechanism defines a pressure chamber by means of a cap member that closes an upper end opening of a vehicle body side tube and a piston member. By supplying and discharging a pressure oil to and from the pressure chamber, the piston member ascends and descends, thereby raising and lowering the upper end position of the suspension spring.

9 Claims, 6 Drawing Sheets

FRONT FORK

FIELD OF THE INVENTION

This invention relates to a front fork, and more particularly to an improvement of a front fork serving as a hydraulic shock absorber that is mounted on a front wheel side of a two-wheel vehicle so as to absorb a road surface impact input into the front wheel of the two-wheel vehicle while suspended across the front wheel.

BACKGROUND OF THE INVENTION

Various front forks serving as hydraulic shock absorbers that are mounted on a front wheel side of a two-wheel vehicle so as to absorb a road surface impact input into the front wheel of the two-wheel vehicle while suspended across the front wheel have been proposed in the prior art. For example, JP4-8934A discloses a front fork that can increase or reduce a vehicle height of a two-wheel vehicle by adjusting a spring force of a suspension spring housed in a fork main body.

The front fork disclosed in JP4-8934A includes a plunger serving as a piston. The plunger is provided in series with a suspension spring housed in a fork main body constituted by a vehicle body side tube and a vehicle wheel side tube so as to contact an upper end of the suspension spring.

In this front fork, the plunger slides in an axial direction of the suspension spring in accordance with a supply and a discharge of pressure oil from the exterior of the fork main body, thereby raising and lowering an upper end position of the suspension spring such that the spring force of the suspension spring is adjusted.

At this time, the plunger is housed slidably within a cylinder disposed in an axial center portion on an upper end portion side of the vehicle body side tube. A lower end projecting from the cylinder is latched to an upper end of a tubular spacer. A lower end of the spacer is held on the upper end of the suspension spring.

Hence, in the front fork disclosed in JP4-8934A, the plunger is caused to slide by driving a pressure oil supply/discharge source provided in the vehicle body, for example, and thus the plunger adjusts the spring force of the suspension spring by raising and lowering the upper end position of the suspension spring. In other words, the front fork is capable of adjusting the vehicle height of the two-wheel vehicle.

SUMMARY OF THE INVENTION

The fact that the front fork disclosed in JP4-8934A is capable of adjusting the vehicle height of the two-wheel vehicle by adjusting the spring force of the suspension spring housed in the fork main body is basically not problematic. However, when the front fork disclosed in JP4-8934A is actually put to use, problems may occur.

It is understood that in the front fork described above, a damper having a damping effect that corresponds to an operation of the suspension spring is housed in the fork main body. Further, it is understood from the figures that a rod body constituting the damper is connected to the plunger.

In the front fork disclosed in JP4-8934A, the rod body is connected to the plunger housed slidably in the cylinder, and therefore the rod body is not connected directly to the fork main body.

As a result, in the front fork described above, an axial direction serving as an expansion/contraction direction of the damper may not match an axial direction serving as an expansion/contraction direction of the fork main body. Therefore, a problem arises in that a smooth expansion/contraction operation cannot be secured easily in the damper in relation to the expanding/contracting fork main body.

This invention has been designed in consideration of these circumstances, and an object thereof is to provide a front fork that can adjust a spring force of a suspension spring while securing an expansion/contraction operation of a damper housed in a fork main body so that an improvement in versatility can be expected.

To achieve this object, this invention provides a front fork which is capable of adjusting a spring force of a suspension spring housed in a fork main body constituted by a vehicle body side tube and a vehicle wheel side tube by driving a jack mechanism housed in the fork main body to raise and lower an upper end position of the suspension spring. The jack mechanism comprises a lower end side portion of a cap member that closes an upper end opening of the vehicle body side tube, and a piston member that is linked slidably to the lower end side portion and defines an expanding/contracting pressure chamber with the lower end side portion. The pressure chamber expands and contracts by supplying and discharging a pressure oil to and from the pressure chamber. The piston member ascends and descends relative to the cap member, and raises and lowers the upper end position of the suspension spring.

As a result, in a front fork including a jack mechanism that raises and lowers the upper end position of a suspension spring housed in the fork main body, the spring force of the suspension spring can be adjusted while securing an expansion/contraction operation of a damper housed in the fork main body, and therefore an improvement in versatility can be expected.

Embodiments and advantages of this invention will be described in detail below with reference to the attached figures.

DESCRIPTION OF THE PREFERRED EMBODIMENTS

This invention will be described below on the basis of illustrated embodiments. A front fork according to the embodiments of this invention functions as a hydraulic shock absorber that is mounted on a front wheel side of a two-wheel vehicle so as to absorb a road surface impact input into the front wheel of the two-wheel vehicle while suspended across the front wheel.

A first embodiment of this invention will now be described.

Figure 1:
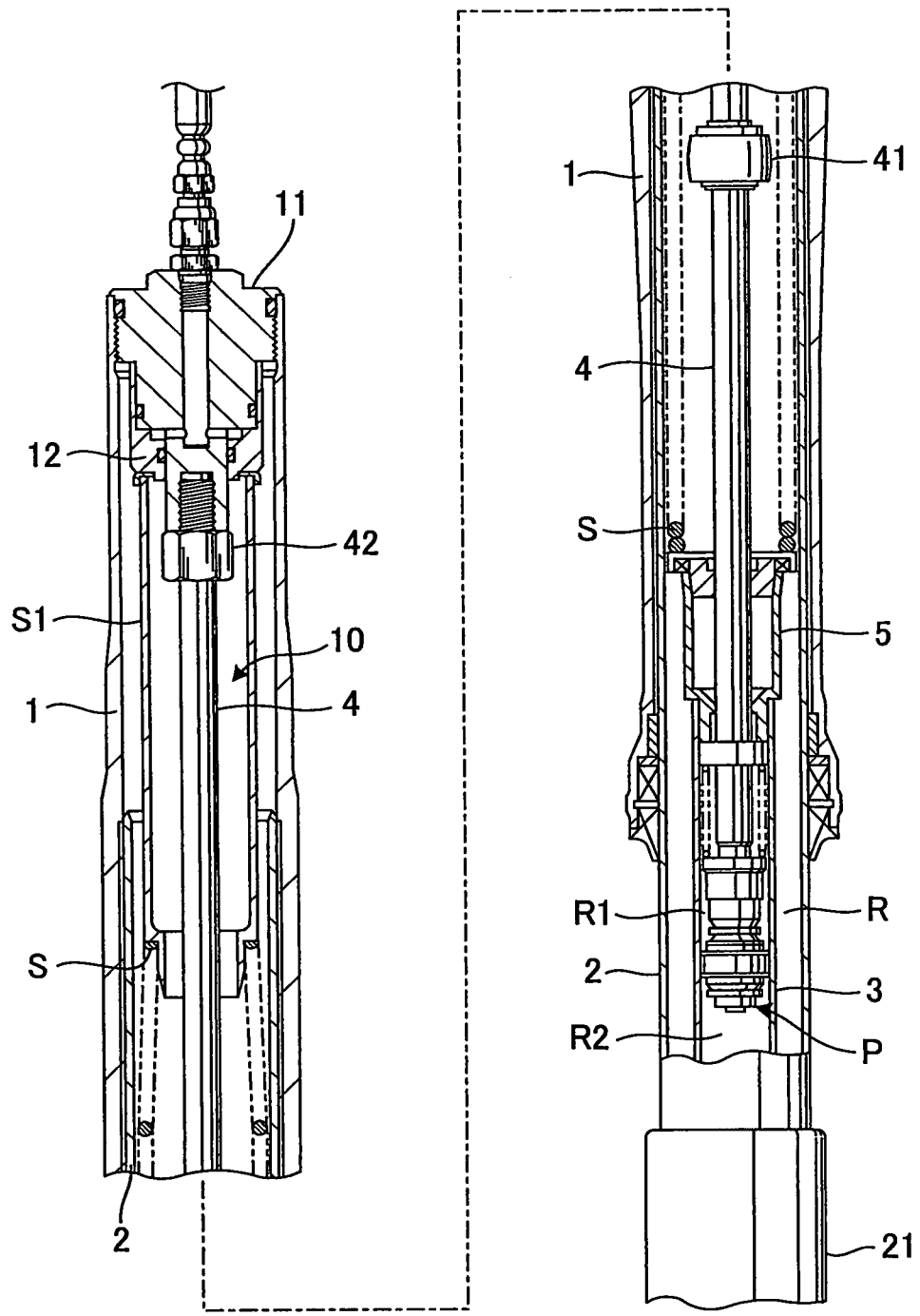
FIG. 1 is a partially cut-away longitudinal sectional view showing a front fork according to a first embodiment of this invention.

As shown in FIG. 1, in this front fork, an upper end position of a suspension spring S that is housed in a fork main body constituted by a vehicle body side tube 1 and a vehicle wheel side tube 2 is raised and lowered by driving a jack mechanism 20 housed in the fork main body. In so doing, a spring force of the suspension spring S can be adjusted.

The front fork shown in FIG. 1 will now be described. In the front fork, the suspension spring S, the jack mechanism 20, and a damper 10 are housed in the fork main body constituted by the vehicle body side tube 1 and the vehicle wheel side tube 2.

In the front fork, a lower end of the suspension spring S is held on a cylinder body 3 side of the damper 10, to be described below. Meanwhile, an upper end of the suspension spring S is latched to the jack mechanism 20, to be described below, rather than to a rod body 4 of the damper 10, via a spacer S1 formed in a tubular shape. The suspension spring S is biased in a direction for causing the vehicle wheel side tube 2 to project from the interior of the vehicle body side tube 1, or in other words a direction for causing the fork main body to expand.

More specifically, the lower end of the suspension spring S is held on an upper end of an oil lock case 5 provided consecutively with an upper end of the cylinder body 3. The upper end of the suspension spring S is latched by a lower end of the spacer S1. An upper end of the spacer S1 is latched to a lower end of a piston member 12. The jack mechanism 20 is constituted by a cap member 11 and the piston member 12.

An oil lock piece 41 held by the rod body 4 of the damper 10 opposes the oil lock case 5. When the fork main body is operated to a state of maximum contraction, the oil lock piece 41 is inserted into the oil lock case 5, thereby realizing a cushioning effect and an oil lock phenomenon.

In the front fork according to this embodiment, the damper 10 is constituted by the cylinder body 3, which serves as a lower end side member standing upright within the vehicle wheel side tube 2, and the rod body 4, which is suspended within the vehicle body side tube 1 to form an upper end side member. In FIG. 1, a tip end portion serving as a lower end portion of the rod body 4 penetrates the cylinder body 3 plungeably.

Although not shown in the figure, a lower end portion of the cylinder body 3 is engaged to a bottom member 21 that closes a lower end opening of the vehicle wheel side tube 2. An upper end portion of the rod body 4 is screwed to the cap member 11, which closes an upper end opening of the vehicle body side tube 1, by a lock nut 42. Hence, the damper 10 is connected integrally to the fork main body so as to expand and contract in synchronization with the expansion/contraction operation of the fork main body.

The damper 10 is preferably formed such that when housed in the fork main body, the damper 10 expands and contracts in synchronization with expansion/contraction of the fork main body. For this purpose, the cylinder body 3 and the rod body 4 penetrating the cylinder body 3 plungeably, which together constitute the damper 10, are preferably connected to the fork main body fixedly.

In the front fork according to this embodiment, an axial direction serving as an expansion/contraction direction of the damper 10 matches an axial direction serving as an expansion/contraction direction of the fork main body. Therefore, a smooth expansion/contraction operation can be secured easily in the damper 10 in relation to the expanding/contracting fork main body.

Figure 2:
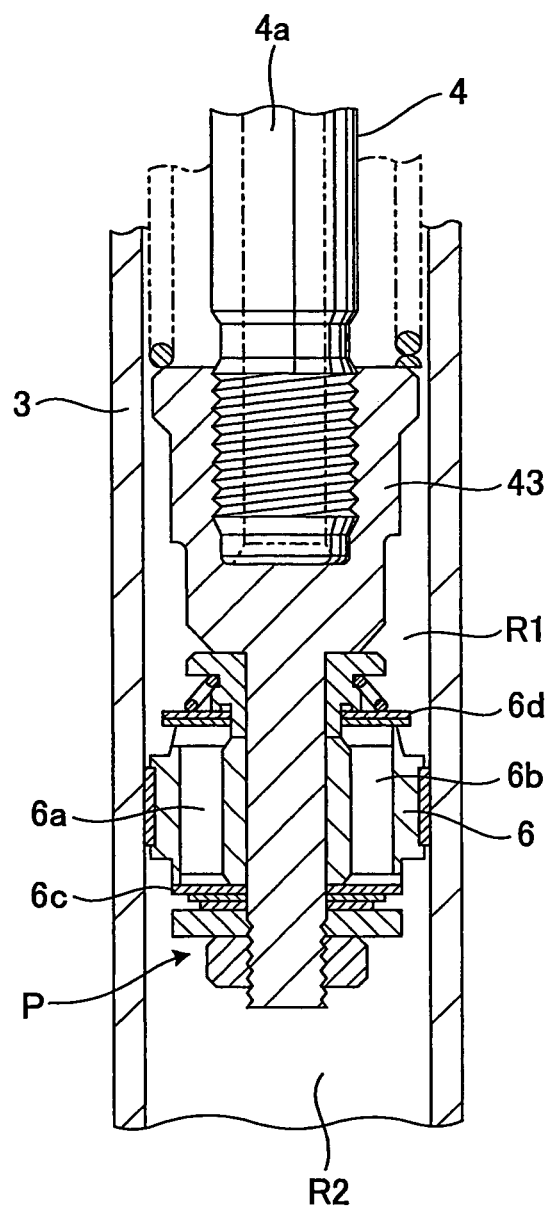
FIG. 2 is a partially enlarged longitudinal sectional view showing a piston portion serving as a damping portion of a damper housed in the front fork of FIG. 1.

Further, the damper 10 includes a piston portion P that is housed slidably within the cylinder body 3 while being held on the tip end portion of the rod body 4. As shown in FIG. 2, the piston portion P is housed slidably in the cylinder body 3 while being held on a tip end member 43 serving as the tip end portion of the rod body 4. The piston portion P includes a piston body 6 that defines an upper chamber R1 and a lower chamber R2 within the cylinder body 3.

The piston body 6 includes an expansion side port 6a, a compression side port 6b, an expansion side damping valve 6c, and a compression side damping valve 6d. The expansion side damping valve 6c closes a downstream side end of the expansion side port 6a openably. The compression side damping valve 6d closes a downstream side end of the compression side port 6b openably.

The damping valves 6c, 6d on the respective sides are constituted by annular leaf valves disposed such that an inner peripheral end is fixed and an outer peripheral end is free. The damping valves 6c, 6d form a gap when the outer peripheral end thereof deflects. Working oil then passes through the formed gap. As a result, a predetermined damping effect is realized.

Although not shown in the figures, the damper 10 includes a base valve portion provided in the lower end portion of the cylinder body 3. An outer side of the cylinder body 3 serves as a reservoir chamber R (see FIG. 1). The lower chamber R2 in the cylinder body 3 is capable of communicating with the reservoir chamber R via the base valve portion.

Although not shown in the figures, the base valve portion includes a compression side damping valve that allows working oil in the lower chamber R2 of the cylinder body 3 to flow out toward the reservoir chamber R. The base valve portion also includes a check valve arranged in series with the compression side damping valve. The check valve allows working oil to flow into the lower chamber R2 of the cylinder body 3 from the reservoir chamber R.

Hence, during a compression operation in the damper 10, i.e. when the piston portion P descends within the cylinder body 3 in synchronization with a compression operation of the fork main body, the working oil in the lower chamber R2 of the cylinder body 3 flows into the upper chamber R1 via the compression side damping valve 6d of the piston portion P. Further, surplus working oil corresponding to a rod infiltration volume flows out of the lower chamber R2 into the reservoir chamber R via the compression side damping valve of the base valve portion. As a result, a predetermined compression side damping effect is realized.

Furthermore, during an expansion operation in the damper 10, i.e. when the piston portion P ascends within the cylinder body 3 in synchronization with an expansion operation of the fork main body, the working oil in the upper chamber R1 of the cylinder body 3 flows into the lower chamber R2 via the expansion side damping valve 6c of the piston portion P. Further, a working oil deficiency corresponding to a rod withdrawal volume is supplied to the lower chamber R2 from the reservoir chamber R via the check valve of the base valve portion. As a result, a predetermined expansion side damping effect is realized.

Incidentally, when the rod body 4 is formed as a pipe body having a through hole 4a in an axial center portion, as shown by an imaginary diagram in FIG. 2, the weight of the rod body 4 can be reduced. Furthermore, increases in a section modulus and a bending strength of the rod body 4 can be achieved.

In this embodiment, as described above, the spring force of the suspension spring S housed in the fork main body can be adjusted using the jack mechanism 20. The jack mechanism 20 will now be described.

Figure 3:
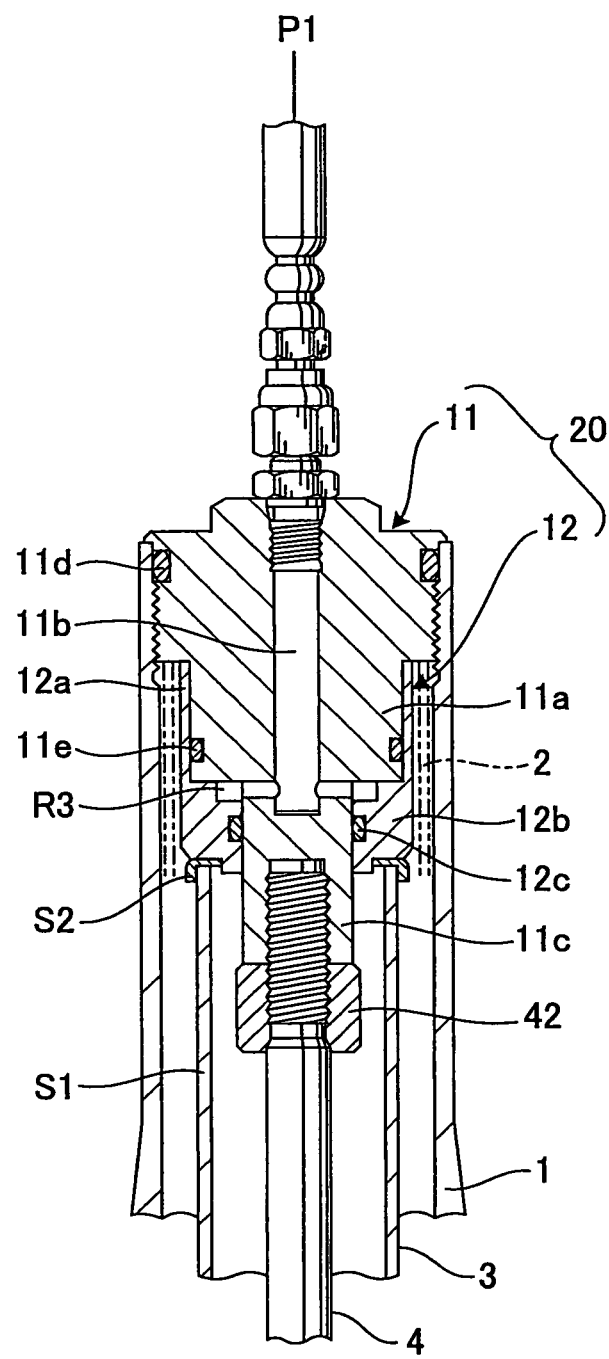
FIG. 3 is a partially enlarged longitudinal sectional view showing an upper end part of a vehicle body side tube in the front fork of FIG. 1.

As shown in FIG. 3, the jack mechanism 20 includes a lower end side portion 11a provided on the cap member 11 that closes the upper end opening of the vehicle body side tube 1, and a piston member 12 that is linked slidably to the lower end side portion 11a of the cap member 11. The piston member 12 defines an expanding/contracting pressure chamber R3 between the piston member 12 and the lower end side portion 11a.

The jack mechanism 20 causes the pressure chamber R3 to expand and contract by supplying the pressure chamber R3 with pressure oil from a pressure oil supply/discharge source (indicated in FIG. 3 only by the reference symbol P1) disposed on the exterior of the fork main body and discharging the pressure oil. The piston member 12 ascends and descends relative to the cap member 11 as the pressure oil is supplied and discharged, thereby raising and lowering the upper end position of the suspension spring S.

The cap member 11 includes a through hole 11b in an axial center portion. The through hole 11b communicates with the pressure chamber R3 and the pressure oil supply/discharge source P1 disposed on the exterior of the fork main body.

The cap member 11 includes a lower end shaft portion 11c that projects downward from the lower end side portion 11a. In the figure, an axial center portion of the lower end shaft portion 11c is screwed to the upper end portion of the rod body 4 by the lock nut 42.

In the damper 10, the upper end portion of the rod body 4 is screwed to the cap member 11 that closes the upper end opening of the vehicle body side tube 1. Further, the cylinder body 3 is engaged to the vehicle wheel side tube 2. In other words, the damper 10 is connected integrally to the fork main body. The axial direction serving as the expansion/contraction direction of the damper 10 matches the axial direction serving as the expansion/contraction direction of the fork main body. As a result, a smooth expansion/contraction operation is secured in the damper 10 relative to the expanding/contracting fork main body. It should be noted that a seal 11d is interposed in an outer periphery of a main body portion of the cap member 11. The seal 11d secures fluid-tightness between the main body portion of the cap member 11 and the vehicle body side tube 1.

The piston member 12 that defines the pressure chamber R3 with the lower end side portion 11a of the cap member 11 includes an upper tube portion 12a that slides along an outer periphery of the lower end side portion 11a of the cap member 11, and a lower portion 12b, an upper end of which is provided consecutively with the upper tube portion 12a.

In the piston member 12, the lower portion 12b projects downward from the lower end side portion 11a of the cap member 11 so as to slide along the outer periphery of the lower end shaft portion 11c, the axial center portion of which is screwed to the upper end portion of the rod body 4. In this state, the upper end of the spacer S1 formed in a tubular shape is latched to the lower end of the piston member 12 via a spring sheet S2.

It should be noted that a seal 11e is interposed in an outer periphery of the lower end side portion 11a of the cap member 11. The seal 11e secures fluid-tightness between the cap member 11 and the upper tube portion 12a of the piston member 12. Further, a seal 12c is interposed in an inner periphery of the lower portion 12b of the piston member 12. The seal 12c secures fluid-tightness between the piston member 12 and the lower end shaft portion 11c of the cap member 11.

In the jack mechanism 20 formed as described above, an outer diameter of the piston member 12 is set to be smaller than an inner diameter of the vehicle wheel side tube 2, which is constituted by an inner tube. Therefore, when the fork main body is maximally contracted, the piston member 12 does not interfere with the vehicle wheel side tube 2 infiltrating the vehicle body side tube 1. As a result, driving of the jack mechanism 20 is not obstructed.

In the jack mechanism 20, an outer diameter of the upper tube portion 12a of the piston member 12 is smaller than the inner diameter of the vehicle wheel side tube 2. Further, the piston member 12 slides along the outer periphery of the lower end side portion 11a of the cap member 11 closing the upper end opening of the vehicle body side tube 1. In comparison with the proposal disclosed in JP4-8934A, for example, the pressure chamber R3 defined between the cap member 11 and the piston member 12 is formed such that a pressure receiving surface area of the pressure chamber R3 can be increased while the inner diameter of the vehicle wheel side tube 2 remains constant, for example. Therefore, with the front fork according to this embodiment, an improvement in operating efficiency relative to supplied oil pressure can be achieved.

Furthermore, the jack mechanism 20 is constituted by the cap member 11 closing the upper end opening of the vehicle body side tube 1 and the piston member 12 linked to the cap member 11, and therefore, in comparison with the proposal disclosed in JP4-8934A, the number of components of the jack mechanism 20 can be reduced. Moreover, only a slight improvement need be made to the pre-existing cap member 11, and therefore the cost of the jack mechanism 20 can be suppressed.

A second embodiment of this invention will now be described.

Figure 4:
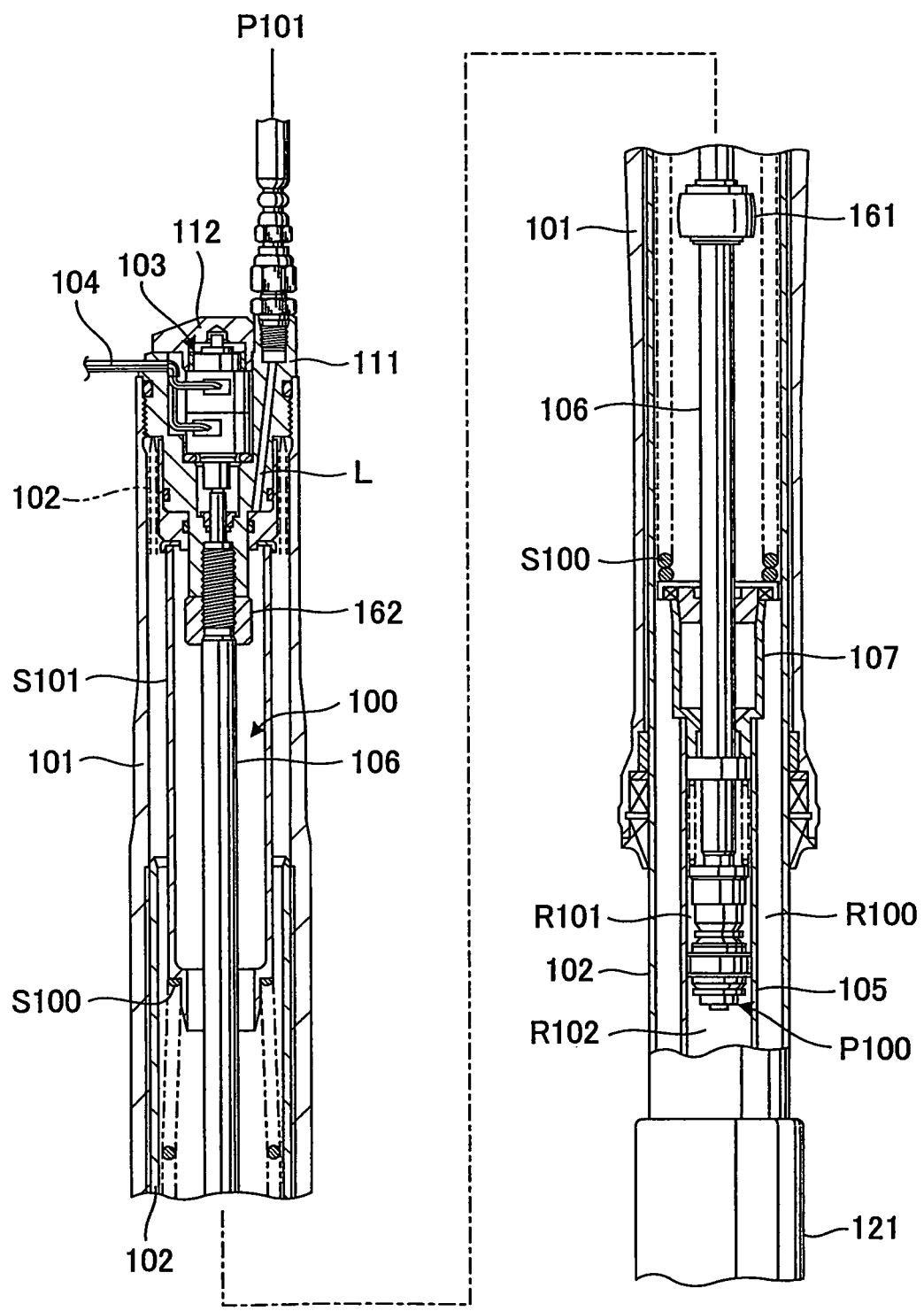
FIG. 4 is a partially cut-away longitudinal sectional view showing a front fork according to a second embodiment of this invention.

As shown in FIG. 4, a front fork includes an actuator 103 that electrically controls, through a remote operation, a damping force generated by a damper 100 in accordance with an expansion/contraction operation of a fork main body constituted by a vehicle body side tube 101 and a vehicle wheel side tube 102. A lead wire 104 extending from the actuator 103 is connected to a remote operation unit, not shown in the figures, on the exterior of the vehicle body side tube 101.

The front fork is capable of adjusting a spring force of a suspension spring S100 housed in the fork main body by driving a jack mechanism 120 housed in the fork main body to raise and lower an upper end position of the suspension spring S100.

In the figures, the actuator 103 and a jack portion of the jack mechanism 120 are basically disposed in an axial center portion on an upper end portion side of the vehicle body side tube 101. The jack portion is positioned below the actuator 103. A pressure oil supply/discharge path L of the jack mechanism 120 is provided in a site that is offset from the axial center portion of the vehicle body side tube 101.

When set in this manner, the pressure oil supply/discharge path L does not extend to the top of the fork main body by penetrating an axial center portion of a cap member 111 that closes an upper end opening of the vehicle body side tube 101. Hence, in contrast to the proposal disclosed in JP4-8934A, the axial center portion of the cap member 111 can be used for another application.

In the front fork, a lower end of the suspension spring S100 is held on a cylinder body 105 side of the damper 100, to be described below. Meanwhile, an upper end of the suspension spring S100 is latched to a rod body 106 side of the damper 10, to be described below, via a spacer S101 formed in a tubular shape. The suspension spring S100 is biased in a direction for causing the vehicle wheel side tube 102 to project from the interior of the vehicle body side tube 101, or in other words a direction for causing the fork main body to expand.

More specifically, the lower end of the suspension spring S100 is held on an upper end of an oil lock case 107 provided consecutively with an upper end of the cylinder body 105. An upper end of the spacer S101 that latches the upper end of the suspension spring S100 is latched to a lower end side portion of the cap member 111 that closes the upper end opening of the cylinder body 105.

An oil lock piece 161 held by the rod body 106 of the damper 100 opposes the oil lock case 107. When the fork main body is operated to a state of maximum contraction, the oil lock piece 161 is inserted into the oil lock case 107, thereby realizing a cushioning effect and an oil lock phenomenon.

In the front fork according to this embodiment, the damper 100 is constituted by the cylinder body 105, which serves as a lower end side member standing upright within the vehicle wheel side tube 102, and the rod body 106, which is suspended within the vehicle body side tube 101 to form an upper end side member. In FIG. 4, a tip end portion serving as a lower end portion of the rod body 106 penetrates the cylinder body 105 plungeably.

Although not shown in the figure, a lower end portion of the cylinder body 105 is engaged to a bottom member 121 that closes a lower end opening of the vehicle wheel side tube 102. An upper end portion of the rod body 106 is screwed by a lock nut 162 to the cap member 111 closing the upper end opening of the vehicle body side tube 101. Hence, the damper 100 expands and contracts in synchronization with an expansion/contraction operation of the fork main body.

The damper 100 further includes a piston portion P100 that is housed slidably within the cylinder body 105 while being held on the tip end portion of the rod body 106. A damping force generated by a damping portion 118 of the piston portion P100 is electrically controlled by the actuator 103, to be described below, through a remote operation.

Figure 5:
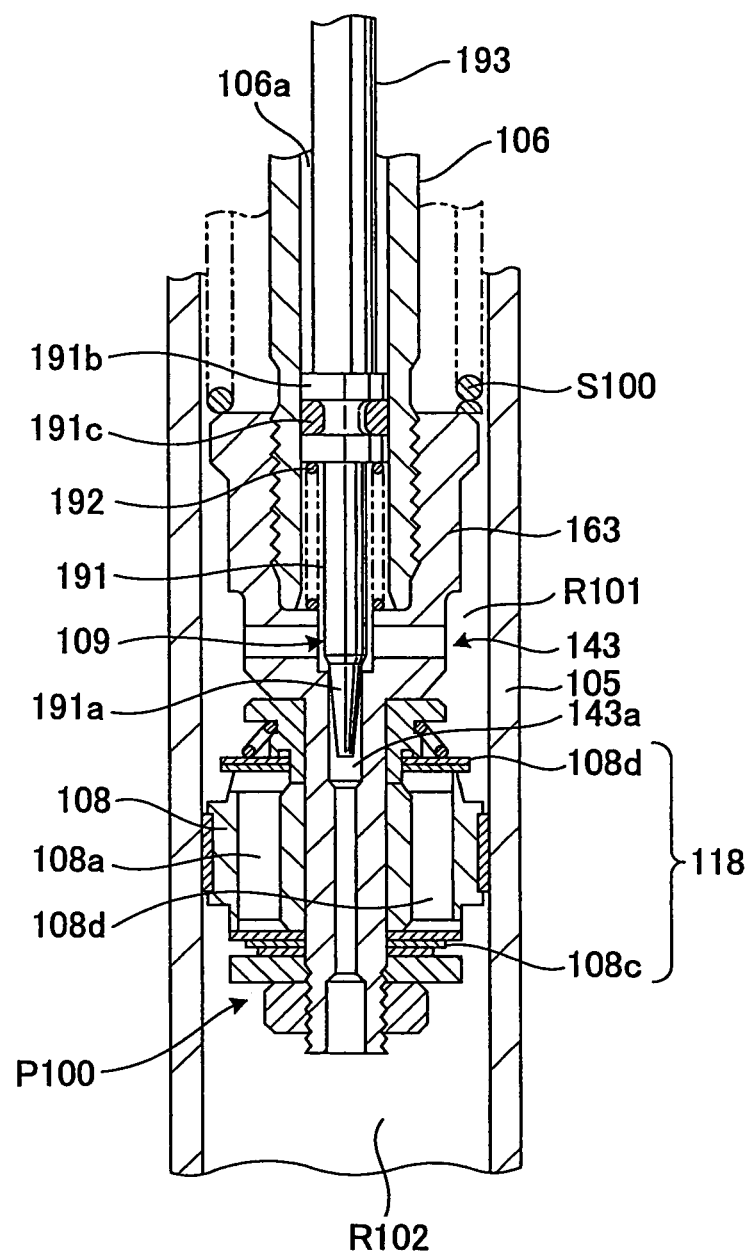
FIG. 5 is a partially enlarged longitudinal sectional view showing a damping portion of a damper housed in the front fork of FIG. 4.

As shown in FIG. 5, the piston portion P100 is housed slidably in the cylinder body 105 while being held on a tip end member 163 serving as the tip end portion of the rod body 106. The piston portion P100 includes a piston body 108 that defines an upper chamber R101 and a lower chamber R102 within the cylinder body 105.

The piston portion P100 includes an expansion side port 108a, a compression side port 108b, an expansion side damping valve 108c, and a compression side damping valve 108d. The expansion side port 108a and compression side port 108b are opened in the piston body 108 to allow communication between the upper chamber R101 and lower chamber R102. The expansion side damping valve 108c closes a downstream side end of the expansion side port 108a openably. The compression side damping valve 108d closes a downstream side end of the compression side port 108b openably.

The piston portion P100 also includes a bypass passage 143 that allows communication between the upper chamber R101 and lower chamber R102 while bypassing the expansion side damping valve 108c and the compression side damping valve 108d. The piston portion P100 also includes a control valve 109 that controls a flow rate through the bypass passage 143.

The damping valves 108c, 108d on the respective sides constitute the damping portion 118 of the piston portion P100. The control valve 109 controls the damping force generated by the damping portion 118.

The damping valves 108c, 108d on the respective sides are constituted by annular leaf valves disposed such that an inner peripheral end is fixed and an outer peripheral end is free. The damping valves 108c, 108d form a gap when the outer peripheral end thereof deflects. Working oil then passes through the formed gap. As a result, a predetermined damping effect is realized.

Although not shown in the figures, the damper 100 includes a base valve portion provided in the lower end portion of the cylinder body 105. An outer side of the cylinder body 105 serves as a reservoir chamber R100 (see FIG. 4). The lower chamber R102 in the cylinder body 105 is capable of communicating with the reservoir chamber R100 via the base valve portion.

Although not shown in the figures, the base valve portion includes a compression side damping valve that allows working oil in the lower chamber R102 of the cylinder body 105 to flow out toward the reservoir chamber R100. The base valve portion also includes a check valve arranged in series with the compression side damping valve. The check valve allows working oil to flow into the lower chamber R102 of the cylinder body 105 from the reservoir chamber R100.

The control valve 109 includes a needle valve body 191. A nib portion 191a of the needle valve body 191 advances into and withdraws from a flow passage 143a of the bypass passage 143, thereby controlling the flow rate of the working oil passing through the flow passage 143a. Thus, the control valve 109 controls the damping force generated by the damping valves 108c, 108d on the respective sides.

The needle valve body 191 of the control valve 109 is biased in a withdrawing direction, i.e. an ascending direction in FIG. 5, by a biasing force of a biasing spring 192 interposed in a base end side of the needle valve body 191. More specifically, the needle valve body 191 controls the flow rate of the working oil passing through the bypass passage 143 by advancing in a descending direction of FIG. 5 when an external force constituted by thrust from the actuator 103 to be described below is input. When the needle valve body 191 descends in FIG. 5, the flow rate of the working oil passing through the bypass passage 143 decreases. When the needle valve body 191 ascends in FIG. 5, on the other hand, the flow rate of the working oil passing through the bypass passage 143 increases.

A base end portion 191b of the needle valve body 191 forms a partition wall portion having a seal 191c on its outer periphery. A back surface of this partition wall portion, or in other words an upper end in FIG. 5, is adjacent to a tip end (a lower end in the figure) of a push rod 193. The push rod 193 penetrates a through hole 106a opened in the axial center portion of the rod body 106, which serves as a control rod that transmits thrust from the actuator 103.

Hence, during a compression operation in the damper 100, i.e. when the piston portion P100 descends within the cylinder body 105 in synchronization with a compression operation of the fork main body, working oil in the lower chamber R102 of the cylinder body 105 flows into the upper chamber R101 via the compression side damping valve 108d of the piston portion P100. Further, surplus working oil corresponding to the rod infiltration volume flows out of the lower chamber R102 into the reservoir chamber R100 via the compression side damping valve of the base valve portion. As a result, a predetermined compression side damping effect is realized.

Furthermore, during an expansion operation in the damper 100, i.e. when the piston portion P100 ascends within the cylinder body 105 in synchronization with an expansion operation of the fork main body, the working oil in the upper chamber R101 of the cylinder body 105 flows into the lower chamber R102 via the expansion side damping valve 108c of the piston portion P100. Further, a working oil deficiency corresponding to the rod withdrawal volume is supplied to the lower chamber R102 from the reservoir chamber R100 via the check valve of the base valve portion. As a result, a predetermined expansion side damping effect is realized.

In this embodiment, as described above, the damping force generated by the damping portion 118 serving as the piston portion P100 of the damper 100 is controlled by the actuator 103 housed in the fork main body. The actuator 103 is controlled electrically by a remote operation. In other words, the damping force generated by the damping portion 118 serving as the piston portion P100 is controlled electrically by a remote operation.

Figure 6:
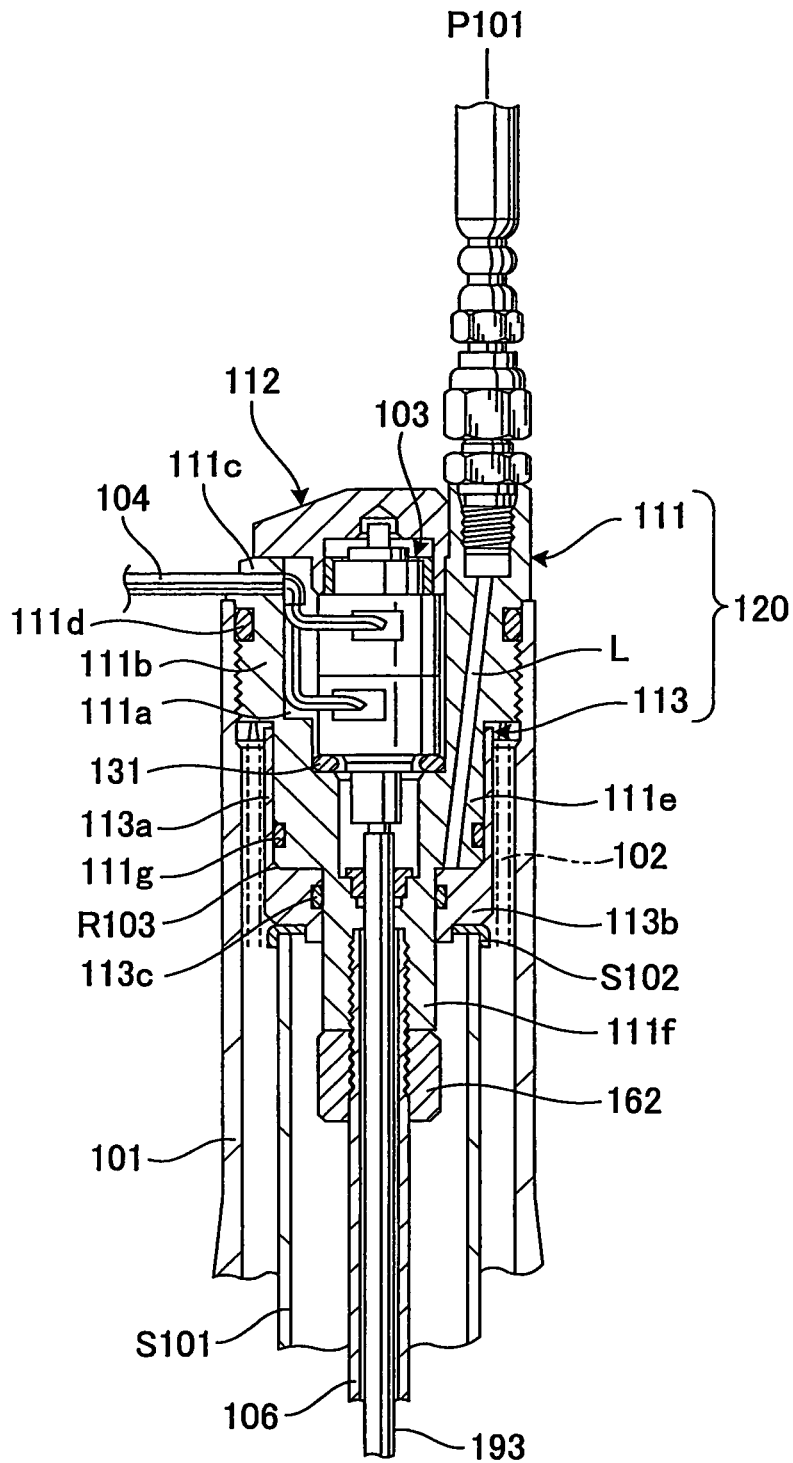
FIG. 6 is a partially enlarged longitudinal sectional view showing an upper end part of a vehicle body side tube in the front fork of FIG. 4.

The actuator 103 will now be described. As shown in FIG. 6, the actuator 103 is housed in the axial center portion of the cap member 111 that closes the upper end opening of the vehicle body side tube 101. The lead wire 104 connected to the actuator 103 penetrates the cap member 111 in a radial direction and extends to the exterior of the cap member 111.

In this embodiment, the so-called cap that closes the upper end opening of the vehicle body side tube 101 is formed with a so-called separated structure constituted by the cap member 111 and a cover member 112 to be described below.

By separating the cap into the cap member 111 and the cover member 112, the actuator 103 can be disposed relative to the cap member 111 easily. Also, the actuator 103 can be fixed in a predetermined position relative to the cover member 112 easily. Moreover, by covering the actuator 103 with the cover member 112, waterproofing can be secured easily.

A recessed portion 111a having an open upper end is provided in the axial center portion of the cap member 111. The recessed portion 111a houses the actuator 103. The lead wire 104 is disposed to face a cutout groove 111c formed in a radial direction in a peripheral wall portion 111b forming the recessed portion 111a. The opening of the recessed portion 111a is closed by press-fitting the cover member 112. When the cover member 112 is press-fitted, the actuator 103 is fixed to the recessed portion 111a.

In this embodiment, the cap member 111 is constituted by a metallic material. However, the cover member 112 is preferably formed from a material that can facilitate the press-fitting operation and improve fixing to the cap member 111. Further, the cover member 112 is preferably formed from a material with which air-tightness relative to the cap member 111 can be obtained easily. When a flexible synthetic resin material, for example, is selected for the cover member 112, the cover member 112 can be manufactured and replaced inexpensively and made both waterproof and durable.

When the actuator 103 is fixed to the recessed portion 111a by press-fitting the cover member 112, an annular seat member 131 is preferably disposed on a bottom portion of the recessed portion 111a. When the seat member 131 is constituted by an elastic material, the actuator 103 can be fixed by press-fitting the cover member 112 without applying excessive force to the actuator 103. Furthermore, vibration of the actuator 103 during an operation can be canceled out.

A seal 111d is interposed in an outer periphery of the peripheral wall portion 111b of the cap member 111 to secure fluid-tightness with the vehicle body side tube 101.

As described above, the lead wire 104 is disposed to face the cutout groove 111c formed in the radial direction in the peripheral wall portion 111b forming the recessed portion 111a of the cap member 111. Although not shown in the figure, a molding material, for example, is often filled into the cutout groove 111c opposing the lead wire 104 to make the cutout groove 111c waterproof.

In this embodiment, when the cap member 111 is screwed to the vehicle body side tube 101, the lead wire 104 is removed from the cutout groove 111c, and therefore the screwing operation of the cap member 111 can be executed without problems.

When supplied with power in the form of a signal via the lead wire 104, the actuator 103 causes the push rod 193 to advance in the downward direction of FIG. 5. When power is not supplied, on the other hand, the actuator 103 causes the push rod 193 to retreat in the upward direction of FIG. 5. The actuator 103 includes a solenoid, for example.

In a front fork having the actuator 103 formed in the manner described above and the lead wire 104 connected thereto, the actuator 103 performs a so-called ON operation, in which the push rod 193 is caused to advance, when power is supplied thereto in the form of a signal via the lead wire 104. As a result, the control valve 109 (see FIG. 5) constituted by the needle valve body 191 (see FIG. 5) that moves in conjunction with the push rod 193 operates to reduce the flow rate of the working oil in the bypass passage 143 bypassing the damping portion 118, leading to an increase in the damping force generated by the damping portion 118.

Conversely, when power in the form of a signal is not supplied via the lead wire 104, the actuator 103 performs a so-called OFF operation in which the push rod 193 is caused to retreat. As a result, the control valve 109 constituted by the needle valve body 191 that moves in conjunction with the push rod 193 operates to increase the flow rate of the working oil in the bypass passage 143 bypassing the damping portion 118, leading to a reduction in the damping force generated by the damping portion 118.

In the front fork, the lead wire 104, which extends from the actuator 103 housed in the axial center portion of the cap member 111 closing the upper end opening of the vehicle body side tube 101 that constitutes the fork main body, penetrates the cap member 111 in the radial direction and extends to the exterior of the cap member 111. Therefore, in comparison with a case where the lead wire 104 extends upward from the upper end of the vehicle body side tube 101, the danger of rainwater infiltration via the periphery of the lead wire 104 can be greatly reduced.

In this embodiment, the lead wire 104 penetrates only the cap member 111, and therefore, in contrast to a case where the lead wire 104 penetrates both the cap member 111 and the vehicle body side tube 101 in the radial direction, the vehicle body side tube 101 does not require any extra processing. Similarly, in this embodiment, the lead wire 104 penetrates only the cap member 111, and therefore, in contrast to a case where the lead wire 104 penetrates only the vehicle body side tube 101 in the radial direction, the vehicle body side tube 101 does not require any extra processing. Hence, the durability of the vehicle body side tube 101 is not reduced unnecessarily, and moreover, an increase in the number of processing steps can be suppressed.

Furthermore, since the lead wire 104 penetrates the cap member 111 in the radial direction and extends to the exterior of the cap member 111, the lead wire 104 is less likely to be knocked over by a so-called lateral force than in a case where the lead wire 104 extends upward from the upper end of the vehicle body side tube 101. Hence, there is no danger of an internal breakage in the lead wire 104 occurring when the lead wire 104 is knocked over or repeatedly knocked over and stood back up.

As a result, in a front fork having the actuator 103, which is housed in the fork main body to control the damping force electrically through a remote operation, electrical defects in the lead wire 104 connected to the actuator 103 are unlikely to occur.

In this embodiment, as described above, the spring force of the suspension spring S100 housed in the fork main body can be adjusted by the jack mechanism 120. The jack mechanism 120 will now be described.

As shown in FIG. 6, the jack mechanism 120 includes a lower end side portion 111e of the cap member 111 closing the upper end opening in the vehicle body side tube 101, and a piston member 113 that is linked to the lower end side portion 111e of the cap member 111 slidably and defines an expanding/contracting pressure chamber R103 with the lower end side portion 111e.

The jack mechanism 120 causes the pressure chamber R103 to expand and contract by supplying the pressure chamber R103 with pressure oil from a pressure oil supply/discharge source (indicated in FIG. 6 only by the reference symbol P101) disposed on the exterior of the fork main body, and discharging the pressure oil. The piston member 113 ascends and descends relative to the cap member 111 as the pressure oil is supplied and discharged, thereby raising and lowering the upper end position of the suspension spring S100.

The cap member 111 includes a pressure oil supply/discharge passage L constituted by a through hole. The pressure oil supply/discharge passage L communicates with the pressure chamber R103. The pressure oil supply/discharge passage L also communicates with the pressure oil supply/discharge source P101 disposed on the exterior of the fork main body. As described above, and as shown in the figure, the pressure oil supply/discharge passage L is offset from the axial center portion of the cap member 111.

By offsetting the pressure oil supply/discharge passage L from the axial center portion of the cap member 111, the actuator 103 and the jack portion of the jack mechanism 120 can be disposed in the axial center portion of the vehicle body side tube 101.

The cap member 111 includes a lower end shaft portion 111f that projects downward from the lower end side portion 111e. As shown in the figure, an upper end portion of the rod body 106 is screwed to an axial center portion of the lower end shaft portion 111f by a lock nut 162.

In the damper 100, the upper end portion of the rod body 106 is screwed to the cap member 111 closing the upper end opening of the vehicle body side tube 101. Further, the cylinder body 105 is engaged to the vehicle wheel side tube 102. In other words, the damper 100 is connected integrally to the fork main body. An axial direction serving as the expansion/contraction direction of the damper 100 matches an axial direction serving as the expansion/contraction direction of the fork main body. Therefore, a smooth expansion/contraction operation is secured in the damper 100 in relation to the expanding/contracting fork main body.

The piston member 113 that defines the pressure chamber R103 with the lower end side portion 111e of the cap member 111 includes an upper tube portion 113a that slides along an outer periphery of the lower end side portion 111e of the cap member 111, and a lower portion 113b, an upper end of which is provided consecutively with the upper tube portion 113a.

In the piston member 113, the lower portion 113b projects downward from the lower end side portion 111e of the cap member 111 so as to slide along the outer periphery of the lower end shaft portion 111f, the axial center portion of which is screwed to the upper end portion of the rod body 106. In this state, the upper end of the spacer S101 formed in a tubular shape is latched to the lower end of the piston member 113 via a spring sheet S102.

It should be noted that a seal 111g is interposed in an outer periphery of the lower end side portion 111e of the cap member 111. The seal 111g secures fluid-tightness between the cap member 111 and the upper tube portion 113a of the piston member 113. Further, a seal 113c is interposed in an inner periphery of the lower portion 113b of the piston member 113. The seal 113c secures fluid-tightness between the piston member 113 and the lower end shaft portion 111f of the cap member 111.

It should also be noted that the lower end shaft portion 111f of the cap member 111 and the piston member 113, the lower portion 113b of which slides along the lower end shaft portion 111f, together constitute the jack portion of the jack mechanism 120.

In the jack mechanism 120 formed as described above, an outer diameter of the piston member 113 is set to be smaller than an inner diameter of the vehicle wheel side tube 102, which is constituted by an inner tube. Therefore, when the fork main body is maximally contracted, the piston member 113 does not interfere with the vehicle wheel side tube 102 infiltrating the vehicle body side tube 101. As a result, driving of the jack mechanism 120 is not obstructed.

In the jack mechanism 120, an outer diameter of the upper tube portion 113a of the piston member 113 is smaller than the inner diameter of the vehicle wheel side tube 102. Further, the piston member 113 slides along the outer periphery of the lower end side portion 111e of the cap member 111 closing the upper end opening of the vehicle body side tube 101. In comparison with a proposal disclosed in JP2008-14431A, for example, the pressure chamber R103 defined between the cap member 111 and the piston member 113 is formed such that a pressure receiving surface area of the pressure chamber R103 can be increased while the inner diameter of the vehicle wheel side tube 102 remains constant, for example. Therefore, with the front fork according to this embodiment, an improvement in operating efficiency relative to supplied oil pressure can be achieved.

Furthermore, the jack mechanism 120 is constituted by the cap member 111 closing the upper end opening of the vehicle body side tube 101 and the piston member 113 linked to the cap member 111, and therefore, in comparison with the proposal disclosed in JP4-8934A, the number of components of the jack mechanism 120 can be reduced. Moreover, only a slight improvement need be made to the pre-existing cap member 111, and therefore the cost of the jack mechanism 120 can be suppressed.

As noted above, it is assumed that the actuator 103 is constituted by a solenoid. However, according to the intent of this invention, although the control structure of the bypass passage 143 requires improvement, the actuator 103 may be constituted by a stepping motor.

In the embodiment described above, the fork main body is set in an inverted shape with the vehicle body side tube 1, 101 as an outer tube and the vehicle wheel side tube 2, 102 as an inner tube. However, when realizing this invention, the fork main body may be set in a normal upright shape not shown in the figures such that, conversely, the vehicle body side tube 1, 101 serves as an inner tube and the vehicle wheel side tube 2, 102 serves as an outer tube.

As described above, the pressure chamber R3, R103 of the jack mechanism 20, 120 is connected to the pressure oil supply/discharge source P1, P101 disposed on the exterior of the fork main body. However, as long as the jack mechanism 20, 120 according to this invention functions, water may be used as the fluid that is supplied to and discharged from the pressure chamber R3, R103 instead of oil. Furthermore, since a fluid is acceptable, a gas may also be used.

In a case where water is used, the water is easily available as a material. In a case where a gas is used, an advantage is obtained in that an air spring effect can be expected in the pressure chamber R3, R103.

A front fork serving as a hydraulic shock absorber that is mounted on a front wheel side of a two-wheel vehicle and suspended across the front wheel of the two-wheel vehicle was described above as a specific example of this invention. However, according to the intent of this invention, the invention may be realized as a shock absorber that is disposed on respective wheels of a four-wheel vehicle to form a suspension device. In this case, identical actions and effects are obtained.

This application claims priority based on Japanese Patent Application 2008-257454 and Japanese Patent Application 2008-257455, published by the Japan Patent Office on Oct. 2, 2008, the entire contents of which are incorporated into this specification by reference.

The invention claimed is:

1. A front fork which is capable of adjusting a spring force of a suspension spring housed in a fork main body constituted by a vehicle body side tube and a vehicle wheel side tube by driving a jack mechanism housed in the fork main body to raise and lower an upper end position of the suspension spring, wherein the jack mechanism comprises:
   a lower end side portion of a cap member that closes an upper end opening of the vehicle body side tube; and
   a piston member that is linked slidably to the lower end side portion and defines an expanding/contracting pressure chamber with the lower end side portion, the piston member including
      an upper tube portion that slides along an outer periphery of the lower end side portion of the cap member, an outer diameter of the upper tube portion being smaller than an inner diameter of the vehicle wheel side tube inserted into the vehicle body side tube, and
   by supplying and discharging a pressure oil to and from the pressure chamber such that the pressure chamber expands and contracts, the piston member ascends and descends relative to the cap member, thereby raising and lowering the upper end position of the suspension spring.

2. The front fork as defined in claim 1, wherein a through hole is provided in an axial center portion of the cap member, and
   the through hole communicates with the pressure chamber and communicates with a pressure oil supply/discharge source disposed on an exterior of the fork main body.

3. A front fork which is capable of adjusting a spring force of a suspension spring housed in a fork main body constituted by a vehicle body side tube and a vehicle wheel side tube by driving a jack mechanism housed in the fork main body to raise and lower an upper end position of the suspension spring, wherein the jack mechanism comprises:
   a lower end side portion of a cap member that closes an upper end opening of the vehicle body side tube; and
   a piston member that is linked slidably to the lower end side portion and defines an expanding/contracting pressure chamber with the lower end side portion, the piston member including
      a lower portion, an upper end of which is provided consecutively with an upper tube portion that slides along an outer periphery of the lower end side portion of the cap member, and
      the lower portion slides along a lower end shaft portion that projects downward from the lower end side portion of the cap member, and
   by supplying and discharging a pressure oil to and from the pressure chamber such that the pressure chamber expands and contracts, the piston member ascends and descends relative to the cap member, thereby raising and lowering the upper end position of the suspension spring.

4. The front fork as defined in claim 1, wherein a lower end of the suspension spring is held on the vehicle wheel side tube,
   an upper end of the suspension spring contacts a lower end of a tubular-shaped spacer, and
   an upper end of the spacer latches to a lower end of a lower portion of the piston member, which is provided consecutively with the upper tube portion of the piston member.

5. The front fork as defined in claim 1, wherein a damper is provided in an axial center portion of the fork main body,
   the damper includes a rod body that penetrates a cylinder body plungeably, and
   an upper end portion of the rod body is screwed to an axial center portion of a lower end shaft portion that projects downward from the lower end side portion of the cap member.

6. The front fork as defined in claim 1, further comprising:
   an actuator that controls a damping force accompanying an expansion/contraction operation of the fork main body electrically through a remote operation and is housed in an axial center portion of the cap member, and
   a lead wire that is connected to a remote control unit and penetrates the cap member in a radial direction from the actuator so as to extend to an exterior of the vehicle body side tube,
   wherein the jack mechanism includes a pressure oil supply/discharge passage which is offset from the axial center portion of the cap member,
   the pressure oil supply/discharge passage communicates with the pressure chamber and a pressure oil supply/discharge source disposed on an exterior of the fork main body, and
   by supplying and discharging a pressure oil to and from the pressure chamber via the pressure oil supply/discharge passage such that the pressure chamber expands and contracts, the piston member ascends and descends relative to the cap member, thereby raising and lowering the upper end position of the suspension spring.

7. The front fork as defined in claim 6, wherein the cap member comprises:
   a recessed portion housing the actuator, an upper end of which opens in the axial center portion; and
   a cutout groove formed in the radial direction in a peripheral wall portion of the recessed portion so as to face the lead wire,
   wherein the opening is closed by press-fitting a cover member therein, and by press-fitting the cover member, the actuator is fixed to the recessed portion.

8. The front fork as defined in claim 6, wherein the fork main body includes a damper,
   the damper includes a piston portion that is housed slidably in a cylinder body while being held on a rod body that penetrates the cylinder body plungeably,
   the piston portion includes a damping portion, and
   the actuator controls a damping force of the damping portion.

9. The front fork as defined in claim 6, wherein the fork main body includes a damper,
   the damper includes a rod body that penetrates a cylinder body plungeably, and an upper end portion of the rod body is screwed to a lower end shaft portion that projects downward from the lower end side portion of the cap member.

* * * * *